Oct. 23, 1956     R. R. NYDEGGER ET AL     2,767,534
ART OF SHEET DELIVERY AND STACKING
Filed Oct. 26, 1951     8 Sheets-Sheet 1

INVENTORS:
ROLAND R. NYDEGGER
DERMOT F. HOLDEN
BY
Sorrison, Kennedy Campbell
ATTORNEYS Oct. 23, 1956 R. R. NYDEGGER ET AL 2,767,534
ART OF SHEET DELIVERY AND STACKING
Filed Oct. 26, 1951 8 Sheets-Sheet 3

INVENTORS:
ROLAND R. NYDEGGER
DERMOT F. HOLDEN.
BY
ATTORNEYS:

Oct. 23, 1956

R. R. NYDEGGER ET AL 2,767,534

ART OF SHEET DELIVERY AND STACKING

Filed Oct. 26, 1951

INVENTORS:
ROLAND R. NYDEGGER
DERMOT F. HOLDEN
BY
Morrison, Kennedy & Campbell
ATTORNEYS:

Oct. 23, 1956  R. R. NYDEGGER ET AL  2,767,534
ART OF SHEET DELIVERY AND STACKING
Filed Oct. 26, 1951  8 Sheets-Sheet 5

INVENTORS:
ROLAND R. NYDEGGER
DERMOT F. HOLDEN
BY
Morrison, Kennedy & Campbell
ATTORNEYS

//<!-- -->

United States Patent Office 2,767,534
Patented Oct. 23, 1956

2,767,534

ART OF SHEET DELIVERY AND STACKING

Roland R. Nydegger, Metuchen, and Dermot F. Holden, Raritan Township, Middlesex County, N. J., assignors to Johnson & Johnson, a corporation of New Jersey Application October 26, 1951, Serial No. 253,288

9 Claims. (Cl. 53—62)

The present invention relates to improvements in the art of delivering sheets and stacking them into batches or piles, each containing a predetermined number of sheets.

Sheets such as hospital bed underpads, because of their construction present certain problems when handled for stacking and packaging under high speed operating conditions. Such sheets are comparatively large, flexible and light and each comprises a series of superposed layers secured together only at spaced regions. Consequently, such sheets are somewhat unwieldy and have a tendency to balloon due to the entry of air between the layers, rendering control thereof somewhat difficult. Moreover, when packing in deep cartons, if the lightweight sheets are delivered successively directly into such cartons, the gravity descent therein of the sheets singly would be so slow as to hold up seriously packaging operations. Also, in the handling of such sheets, difficulties are encountered in the overlapping of the forward end of a sheet moving into stacking position with respect to the rear end of the next previous sheet in the process of being stacked. Furthermore, during intervals when a filled carton is being replaced by an empty one, interruption in the continuous flow of the sheets is required to effect the transition.

One object of the present invention is to provide a new and improved method of delivering and stacking sheets, which lends itself admirably to high speed operations and which is effective to form neat orderly piles, each having a predetermined counted number of sheets, without stoppage or other interference with the delivery of a continuous regular procession of sheets.

Another object is to provide a new and improved machine for delivering and stacking sheets for packaging, which lends itself effectively to high speed continuous operations, which maintains the sheets under accurate control until the sheets are neatly stacked in a carton, which embodies collating features by which a plurality of stacks are formed simultaneously from a single line of sheet delivery, each stack containing a predetermined counted number of sheets, and which in spite of its high capacity occupies a minimum of floor space.

In accordance with certain features of the invention, the sheets are counted, collected and stacked in a hopper to form successive batches, of comparatively small height, and as each batch is formed, it is dumped as a unit into a comparatively high carton, until the carton is filled or partially filled with a predetermined number of such batches. The accumulation of sheets into low batches is effected under easy control conditions, in spite of the tendency of the sheets to puff out during transit.

As a further feature, the batches are formed in the hopper over the carton, and after a batch containing a predetermined number of sheets has been collected, the bottom of the hopper is opened to dump the batch into the carton in a manner to maintain the sheets in orderly stacked relationship and to deposit the batch neatly in the carton.

As an additional feature, two stacking hoppers alongside of each other in the course of delivery travel of the sheets and above two carton stations respectively are provided for forming the successive batches. The sheets are successively directed into the first hopper until a predetermined counted number of sheets have been collected and stacked into a batch in said hopper. The flow of successive sheets is then shunted to the other hopper, while the batch in the first hopper is being dumped into the carton below it. The filling of this other hopper is continued until a predetermined counted number of sheets have been collected and stacked into a batch in said latter hopper. By this time, the first hopper has dumped the batch and is ready to resume operations again. The flow of successive sheets is at this phase switched back to the first hopper, while the other hopper is operated to dump its batch into the carton below it. This alternate collection of sheet batches at the two stacking hoppers and the dumping of these batches into the respective cartons, permits operation without interrupting the continuous procession of sheets along the delivery course of the sheets to the stacking hoppers.

As a further feature, the two cartons are supported on a single take-away conveyor movable in a direction below and substantially parallel to the direction of advancement of the sheets to the stacking hoppers and the intervals when the cartons are placed under their respective stacking hoppers are so correlated with the stacking operations, that when a carton below the second hopper is partially filled with a predetermined number of sheets, the carton under the first hopper is filled to its capacity with a predetermined number of sheets. At that instant, the take-away conveyor is operated in a direction to carry away the filled carton from position underneath the first hopper and to move the partially filled carton from position underneath the second hopper into filling position underneath the first hopper. An empty carton for partial filling can then be deposited underneath the second hopper and the operation described repeated.

As a further feature, a pair of deflector blades is provided at each stacking station above the hoppers respectively, adapted to check the natural flight of the sheets after they have been released from the sheet advancing means and to direct them downwardly into the respective hoppers. The first deflector blade is movable, so that when a batch having the required amount of sheets has been collected in the first hopper, this blade is moved out of the path of advancement of the sheets to permit them to reach the second deflector blade. At this latter station, the sheets are deflected successively by the blade downwardly into the hopper. With this arrangement, even though the sheets may be expanded or puffed out, they are nevertheless under control during stacking operations.

As another feature, the sheets are gripped at their forward ends near their side edges and are carried by an endless conveyor towards the stacking stations. At the appropriate station, while the sheets are along the lower horizontal run of the conveyor, the gripping means grasping said sheets are released. At that instant, the sheets due to their previous suspension between side supports are substantially in the form of a catenary and the resultant channel or sag formation of the sheets impart thereto sufficient rigidity to cause them to continue their movement by natural flight when released from the gripping means. These released sheets therefore glide towards the sheet deflecting conformation on the deflector bar but their speed is reduced, so that a succeeding sheet travelling at a greater speed under the positive impulse of the conveyor may catch up with a next preceding sheet that has been released. However, the deflecting conformation on the deflector bar is adapted to engage the forward edge of the released sheet when it reaches said conformation and to turn the nose or forward section of the sheet downward. This removes the sag from the sheet and causes it to become limp. As a result, the tail section of the sheet droops down into the hopper and out of the way of the forward end of the next succeeding sheet.

Various other objects, advantages and features of the invention are apparent from the following particular description and from an inspection of the accompanying drawings, in which.

The sheets

Figures 1, 2:
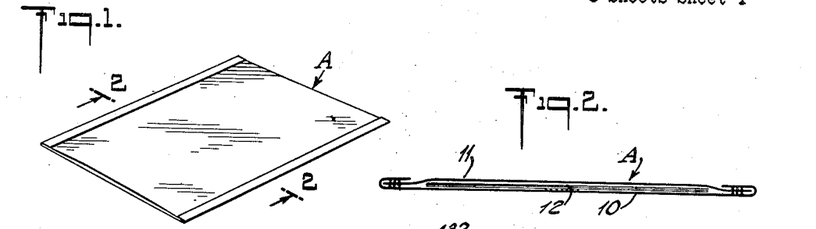
Fig. 1 is a perspective of a multiple layer sheet in the form of a hospital bed underpad which can be efficiently handled by the method and machine of the present invention.
Fig. 2 is a section of the sheet taken along the lines 2—2 of Fig. 1 but showing the sheet slightly puffed out to indicate more clearly the different component layers of the sheet.

Figs. 1 and 2 show the general type of sheet which can be conveniently handled by the machine of the present invention. This sheet A is a so-called hospital bed underpad and comprises a series of superposed layers secured together, as for example by adhesive at spaced points, and open at opposite ends, so that the sheet is free to puff out or balloon in the process of being handled. More specifically, the sheet A is shown comprising a lower waterproofing layer 10 having its side margins turned inwardly, an upper absorbent layer 11 having its sides tucked in underneath the inturned margins of the lower layer and a plurality of filler tissues 12 interleaved between the two outside layers 10 and 11. The sheet A, which is shown expanded in Fig. 2 for the purpose of indicating more clearly its different component layers, is in a specific commercial embodiment about 24 inches long and 18 inches wide and is fairly flexible, so that the handling and control of the sheet presents difficulties.

In the making of the sheets A, a continuous strip is assembled and this strip while advancing is cut by a cutting machine transversely into sections to form these sheets. The cutting machine for this purpose constitutes a supply station for feeding the sheets endwise successively into the sheet delivery and stacking machine embodying the present invention.

General arrangement

Figure 3:
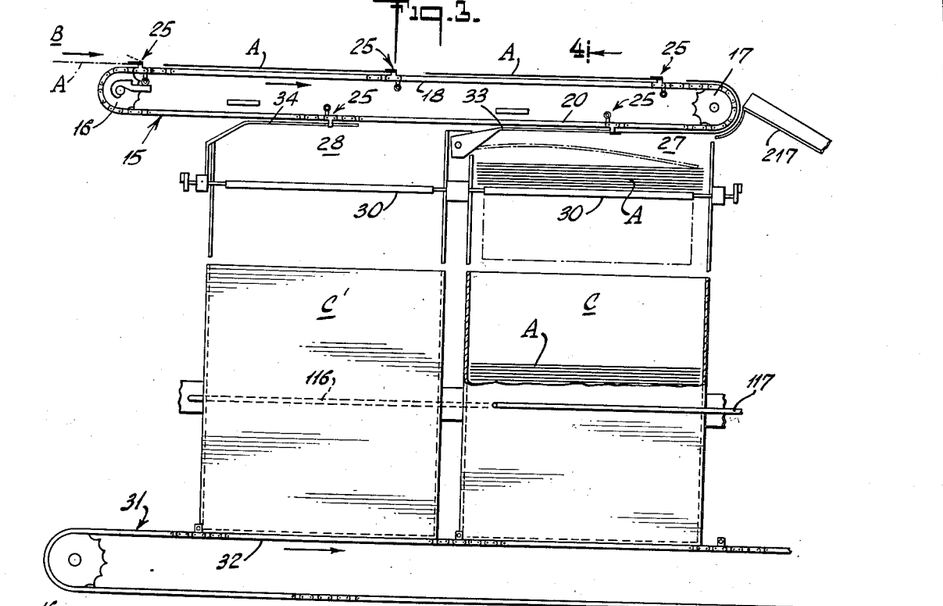
Fig. 3 is a side elevation somewhat diagrammatic of the general arrangement of the assembly embodying the structural features of the present invention and illustrating the method of the present invention.
Figure 4:
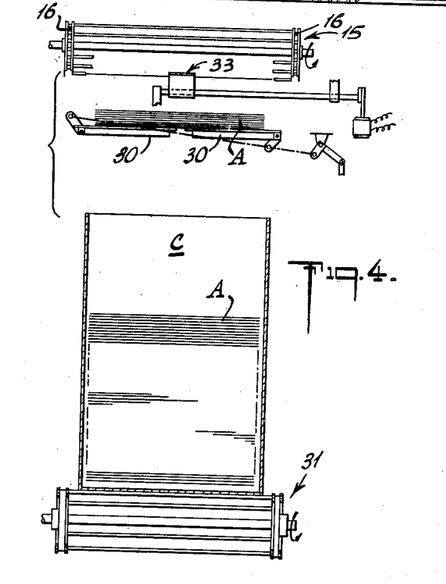
Fig. 4 is a transverse section somewhat diagrammatic of the general assembly taken approximately along the lines 4—4 of Fig. 3.
Figure 5:
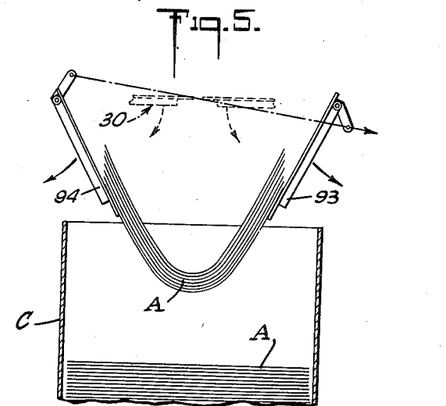
Fig. 5 is a front elevation somewhat diagrammatic of a stacking hopper shown in the process of dumping the stack collected therein into a carton.

Figs. 3, 4 and 5 show diagrammatically the sheet delivery and stacking machine which comprises in general an upper endless conveyor 15 trained around sprockets 16 and 17 and having an upper horizontal run 18 and a lower horizontal run 20. The sheets A are fed successively from a station B, which may be the discharge end of a strip cutting machine as described, to the top horizontal conveyor run 18 at its left hand inlet end (Fig. 1). Secured to the conveyor chains are sheet gripping devices 25, each cam operated into open position to receive a sheet A at the inlet end of the conveyor 15 as said gripping device moves into the inlet end of the conveyor. As the sheet gripping device 25 continues its movement with the conveyor 15, it is operated into closed position to grasp the forward end of the sheet at its side edges and pull the sheet with the speed of the conveyor along the upper run 18, around the sprocket 17 and along part of the course of the lower run 20.

Below the lower conveyor run 20 are two stacking hoppers 27 and 28 arranged alongside of each other, and each having an open top and a drop floor 30. Below the hoppers 27 and 28 is an endless take-away conveyor 31, which has an upper horizontal run 32 parallel to the lower run 20 of the upper sheet advancing conveyor 15 for supporting thereon two packaging or shipping cartons C and C' directly underneath the hoppers 27 and 28 respectively and which is normally stationary. Above the hopper 27 is a sheet deflecting and stacking device 33 and above the hopper 28 is a sheet deflecting and stacking device 34.

Figure 24:
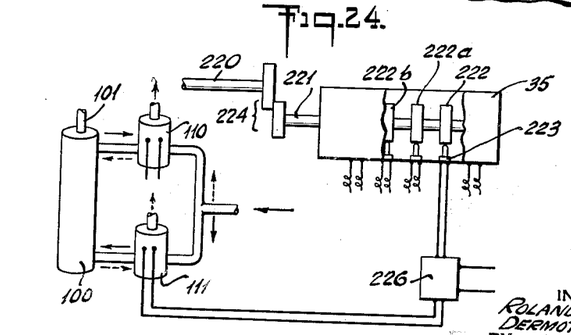
Fig. 24 is a diagram showing the tie-up between the pneumatic system operating the movable sheet deflector bar associated with one of the stacking hoppers and the sheet counter.

In operation, the sheets A are advanced in procession by gripping devices 25 along the bottom run 20 of the conveyor 15. As a sheet A reaches the field of action of the deflecting and stacking device 33 associated with the hopper 27, the sheet is automatically released from the corresponding gripping device by cam operation and deflected into the hopper for stacking. This operation is repeated with successive sheets A until a predetermined number of sheets have been stacked into the hopper 27. A counter mechanism 35 (Fig. 24) which counts the sheets delivered to the conveyor 15 acts as a control to cause the sheet deflecting and stacking device 33 to be rendered inoperative after a predetermined number of sheets have been stacked in the hopper 27. This causes the procession of sheets A along the bottom run 20 of the conveyor 15 to by-pass the inactive sheet deflecting and stacking device 33 and to move into the field of action of the sheet deflecting and stacking device 34 associated with the hopper 28. In this field of action, the sheets A are automatically released from the corresponding gripping device 25 successively by cam operation and deflected into the hopper 28 by the deflecting and stacking device 34. In the meantime, the drop floor 30 of the hopper 27 is automatically opened as shown in Fig. 5, to cause the stack of sheets collected therein to be dumped and piled into the carton C below said hopper. When a predetermined number of sheets A corresponding to the number collected in the hopper 27 has been stacked in the hopper 28, the sheet deflecting and stacking device 33 is again rendered active in response to the operation of the counter 35 (Fig. 24). This switches over the procession of sheets A back to the field of action of the sheet deflecting and stacking mechanism 33 associated with the hopper 27. In the meantime, the drop floor 30 of the hopper 28 is automatically opened to dump and pile the sheets A therein into the carton C' below said hopper. The switching back and forth of the procession of sheets A between the two hoppers 27 and 28, the alternate filling of said hoppers and the alternate dumping of the collected stacks therein is cyclically repeated until the carton C is filled.

When the operation is first started, a half-filled carton C is placed under the hopper 27 and an empty carton C' is placed under the hopper 28. Therefore, when the carton C is filled, the carton C' is half-filled. At that phase, between dumping operations, the take-away conveyor 31 is operated one step automatically in response to the impulse received from the counter 35 (Fig. 24) to cause its carton supporting run 32 to move towards the right (Fig. 3). This moves the filled carton C out of the way to a discharge point, where the packaging is completed by closing the carton, and moves the half-filled carton C' to a position underneath the hopper 27 where its filling is completed. The attendant then places an empty carton C' underneath the hopper 28 and the operation is continued.

*Sheet advancing conveyor*

Figure 9:
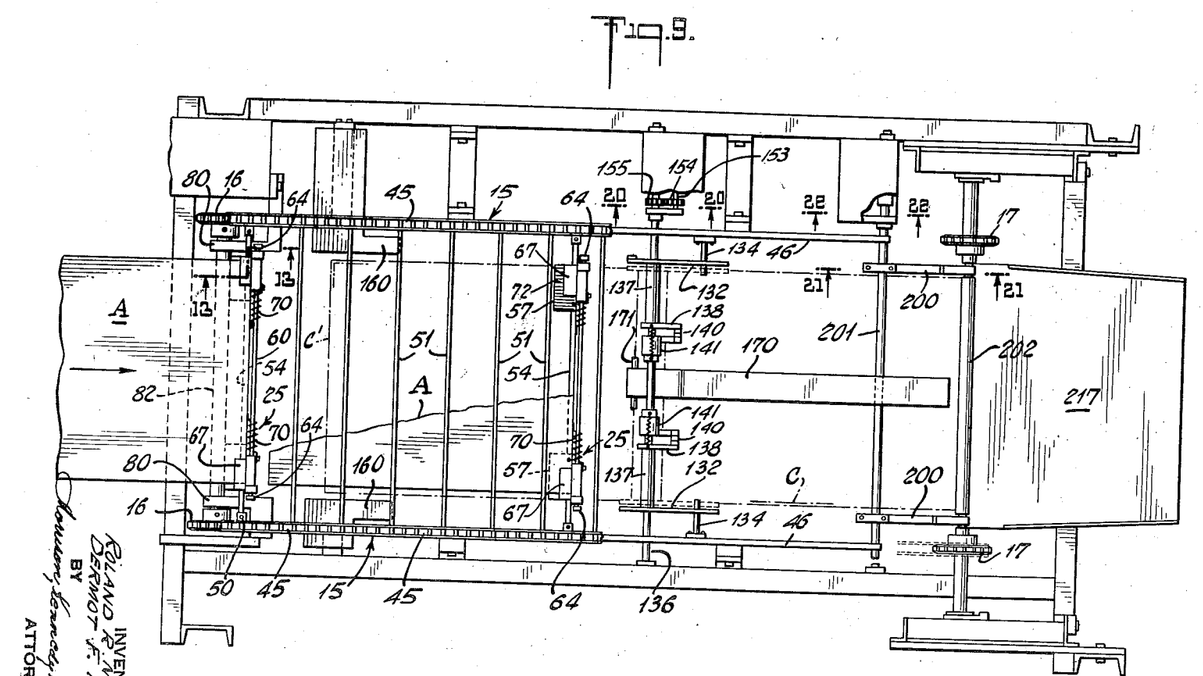
Fig. 9 is a top plan view of the upper part of the general assembly shown in Fig. 3 but on a larger scale.
Figure 10:
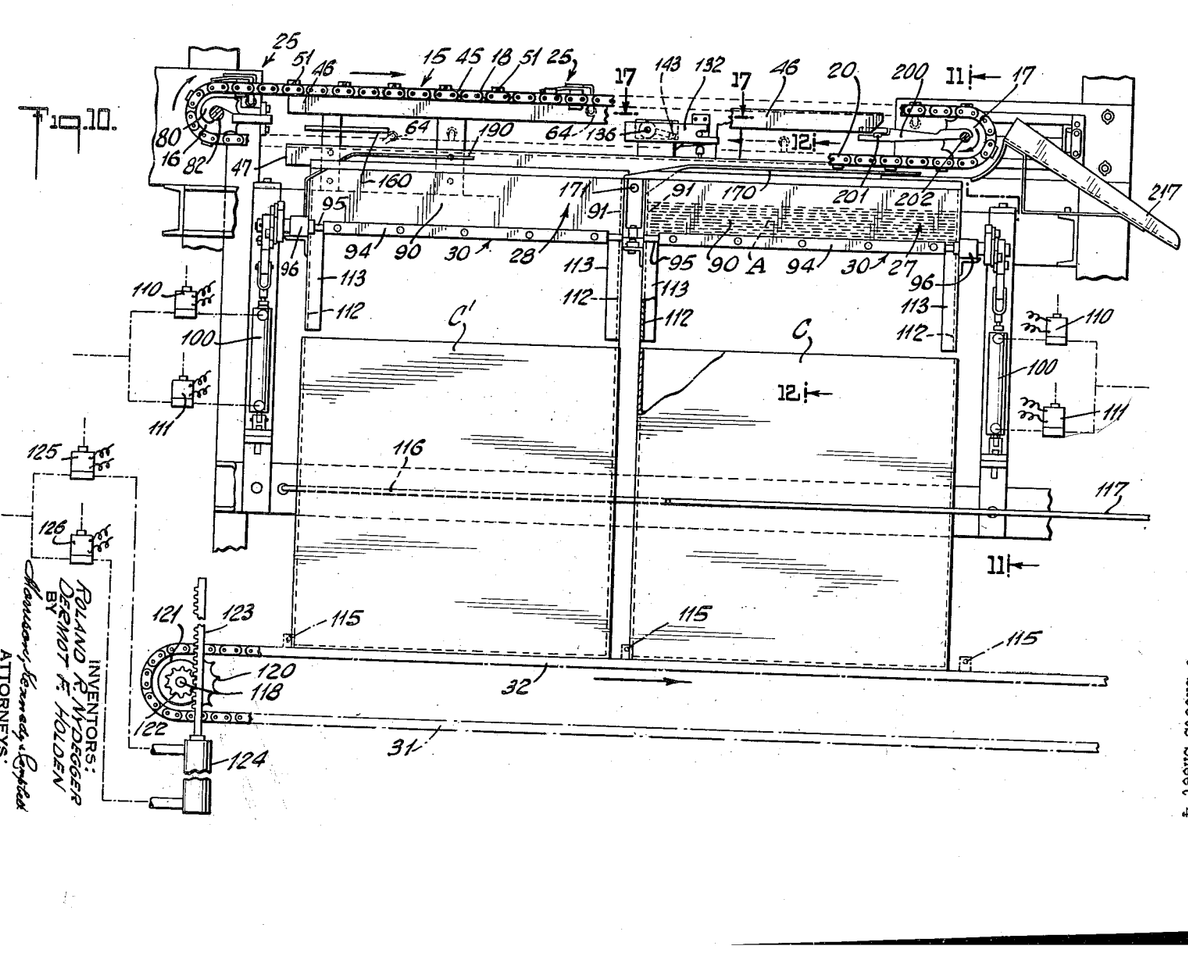
Fig. 10 is a side elevational section of the general assembly taken approximately along the lines 10—10 of Fig. 11.

The sheet advancing conveyor 15 is supported in elevated position on a frame structure comprising two upstanding side frame pieces 44 and comprises two endless chains 45 (Figs. 9, 10 and 11) passing over the sprockets 16 and 17 and supported against the sagging of its two runs 18 and 20 by tracks 46 and 47. Each of the chains 45 comprises a series of pivoted links 48, 49 and 50 (Fig. 13) and the two chains 45 are interconnected by rods 51 (Fig. 9) joining regularly spaced links 49 of the two chains and serving not only as supports for the sheets on the upper conveyor run 18 but also as means for connecting the two chains 45 for movement in unison. The continuous drive to the conveyor 15 is through the shaft of either pair of sprockets 16 and 17 (Figs. 9 and 10).

*Sheet gripping devices*

Each of the sheet gripping devices 25 comprises a pair of chain links 50 (Figs. 9, 13-16) on opposite conveyor chains 45, U-shaped to straddle the ends of a bar 54 and secured thereto, as for example by pin 55. Rigidly secured to the bar 54 near each end, as for example by screws 56, is a sheet gripping plate 57 and also rigidly secured to the bar near its end, as for example by welding are bearings 58 for a rock shaft 60. Secured to this rock shaft 60 near each end for rotation therewith is a generally U-shaped bracket 61 having legs 62 and 63 flanking a corresponding bearing 58. One of the bracket legs 62 serves as a carrier for a cam follower roller 64. The other leg 63 has a recess 65 to receive the flange 66 of a movable gripping plate 67 adapted to overlie the corresponding gripping plate 57 and to cooperate therewith in clamping a sheet therebetween. This movable gripping plate 67 is rigidly secured to the bracket leg 63, as for example by studs or set screws 68. The movable gripping plate 67 is thereby rocked with the shaft 60 towards and away from the associated gripping plate 57 and is normally urged against said gripping plate 57 into closed sheet clamping position shown in Fig. 14 by a corresponding torsion spring 70 embracing said rock shaft and having its ends secured to the bar 54 and to the corresponding bracket 61 respectively.

Figures 13, 14, 15:
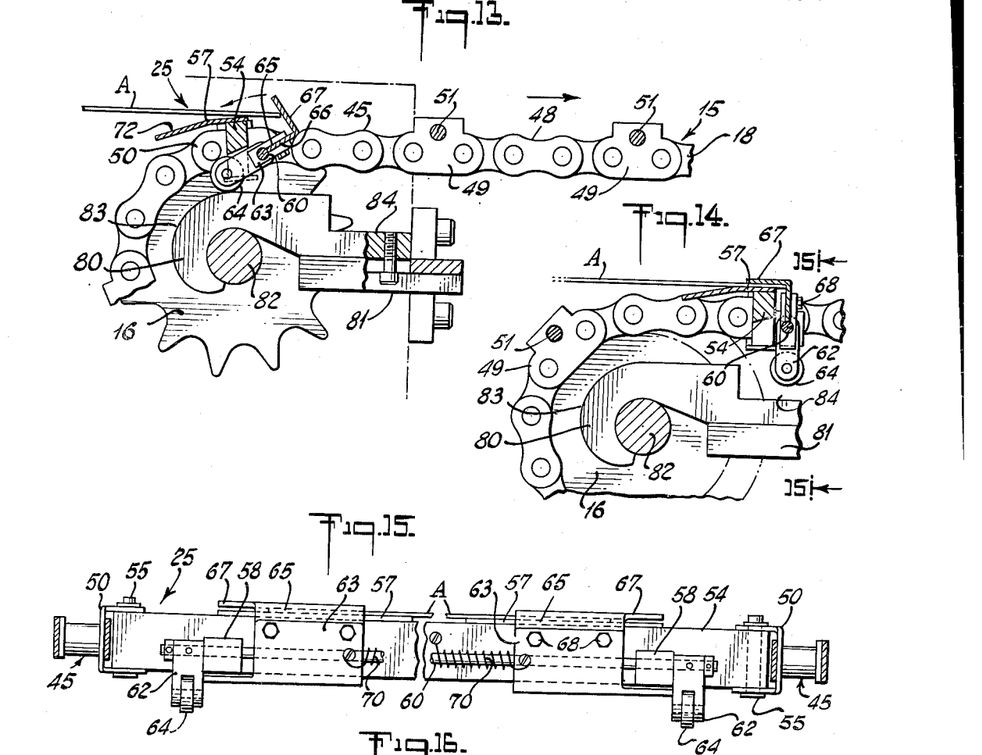
Fig. 13 is a detail section of the gripping device on the conveyor for grasping the forward end of a sheet and advancing it with the conveyor and of the cam for operating the gripping device, the section being taken approximately along the lines 13—13 of Fig. 9 but on a larger scale and showing said gripping device in open position to receive a sheet from a supply station.
Fig. 14 is a detail section of the gripping device and the operating cam therefor similar to that of Fig. 13, but showing the gripping device in closed position to grasp the forward end of the sheet at the sides.
Fig. 15 is a detail section of the gripping device taken on lines 15—15 of Fig. 14.
Figure 16:
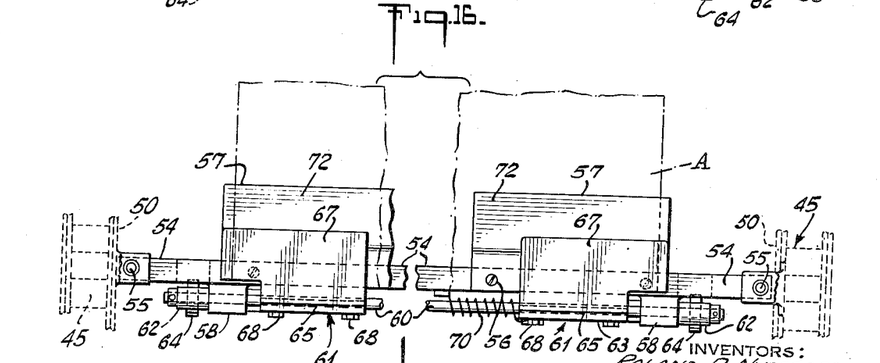
Fig. 16 is a top plan view of the gripping device shown in Fig. 15.

Each of the gripping plates 57 has its trailing end 72 sloping downward in upper run position, as shown in Fig. 13 to serve partially as an apron to guide the sheets A into proper position towards the gripping section of the plate, as the sheets are fed from the cutting machine as described.

Each sheet gripping device 25 is adapted to grasp a sheet A at the forward end and at the side edges and carry it with the conveyor 15 from station B towards the stacking mechanisms 33 and 34.

*Cam device for operating the sheet gripping device at the sheet supply station*

For angularly moving each gripping plate 67 into open position to receive a sheet A, as the gripping device 25 moves towards the supply station B, there is provided on each side of the machine a cam 80 (Figs. 10, 13 and 14) rigidly secured to a supporting structure 81 and shown in the general form of a hook engaging the shaft 82 of the sprockets 16. This cam 80 has a cam surface 83 in the path of travel of the cam follower rollers 64 on the corresponding side of the machine, progressively increasing in radius with respect to the axis of the shaft 82 and having a recess 84. As the sheet gripping device 25 moves clockwise (Fig. 13) about the axis of the sprockets 16, each cam follower roller 64 rides along the cam 80 in the path thereof, and its progressively increasing radius causes the bracket leg 62 carrying said roller to rotate with the rock shaft 60 about the axis of said shaft and against the action of the springs 70 into position to move the gripping plate 67 rigid with said bracket leg away from the gripping plate 57 into open position, until said gripping plate 67 reaches fully open position shown in Fig. 13. While the gripping plate 67 is being cam operated into open position, a sheet A is fed from the cutting machine at station B into the gap between the gripping plates 57 and 67, until the forward end of the sheet engages the plate 67. The sheet A moves with the open gripping plates 57 and 67 along the course of the upper conveyor run 18, until the two cam follower rollers 64 of the gripping device 25 reach the respective cam recesses 84. At that instant, the rollers 64 drop into the cam recesses 84 under the action of the springs 70 and this causes the upper gripping plates 67 to close and clamp down onto the forward end of the sheet A at its sides as shown in Fig. 14, so that the sheet is grasped and is positively pulled by the conveyor 15 at the speed thereof. This sheet grasping position of the upper gripping plates 67 is maintained until either reject operation or sheet releasing operation for stacking is instituted, as will be hereinafter described.

*Hoppers at the stacking stations*

Underneath the lower conveyor run 20 are the two stacking hoppers 27 and 28 (Figs. 3, 4, 5, 10, 11, and 12), each of substantially rectangular shape corresponding internally in size and shape substantially to the sheets A, to receive therein snugly and comfortably the sheets in stacked relationship. The hoppers 27 and 28 have parallel side walls 90 and parallel end walls 91 and are rigidly secured in fixed position to the frame structure of the machine in any suitable manner. The upper end of each hopper 27 and 28 is open and the bottom is normally closed by the drop floor 30 forming a supporting platform for the stacked sheets in the hopper. Each of these drop floors 30 comprises two similar floor sections 93 and 94 of rectangular shape normally extending in the same plane with their inner confronting edges contiguous and their outer edges hinged to the sides of the hopper near its side walls 90. The hinge connection for each floor section 93 and 94 comprises a hinge shaft 95 rigid with said floor section at its outer edge and supported in fixed bearings 96. Each hinge shaft 95 projects from a bearing 96 at one end and is driven at this end by a pneumatic mechanism controlled from the counter 35 (Fig. 24), as will be hereinafter more fully described. The hinge shafts 95 associated with the two sections 93 and 94 of each drop floor 30 are simultaneously rotated at the proper time about one quarter revolution to swing said floor sections down and away from each other in open position as shown in Fig. 5 and to cause the sheets A stacked thereon to be dumped as a unit into the carton C or C' below.

The two hinge shafts 95 for each hopper floor 30 are operated in opposite direction from a mechanism comprising a double acting pneumatic cylinder 100 (Fig. 11) supported on one side of the machine to one of the frame pieces 44 and having a piston or plunger connected to a piston rod 101 pivotally secured at its outer end to one arm of a bell crank 102 secured to a shaft 103 supported in suitable bearings. The other arm of the bell crank 102 is pivotally secured to one end of a long link 104. The other end of this link 104 is pivotally connected to the outer end of a crank 105 secured to one of the hinge shafts 95. The other hinge shaft 95 has a crank 106 secured thereto and pivotally connected to an intermediate section of the link 104.

Figure 11:
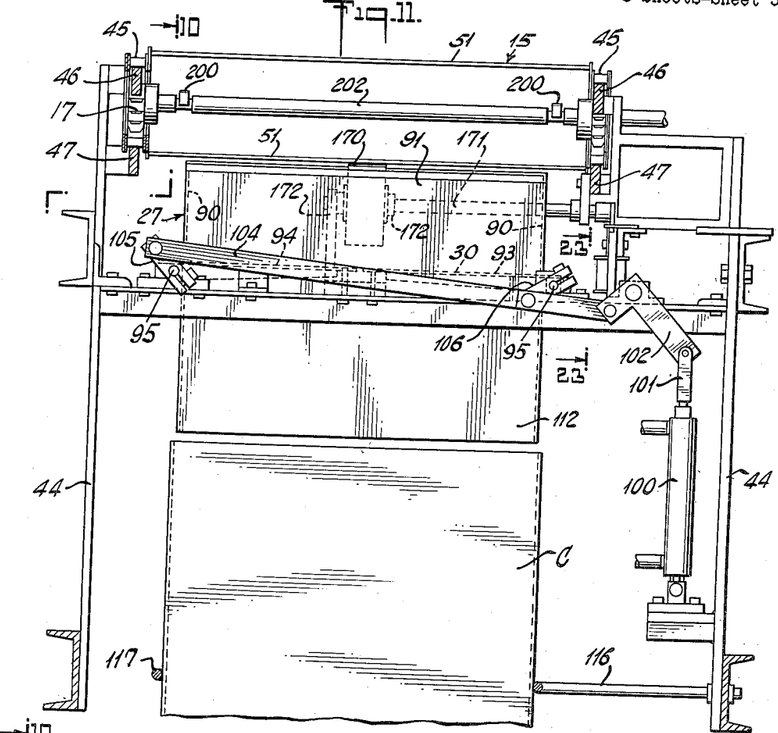
Fig. 11 is a front sectional end view of the general assembly taken approximately along the lines 11—11 of Fig. 10.
Figure 12:
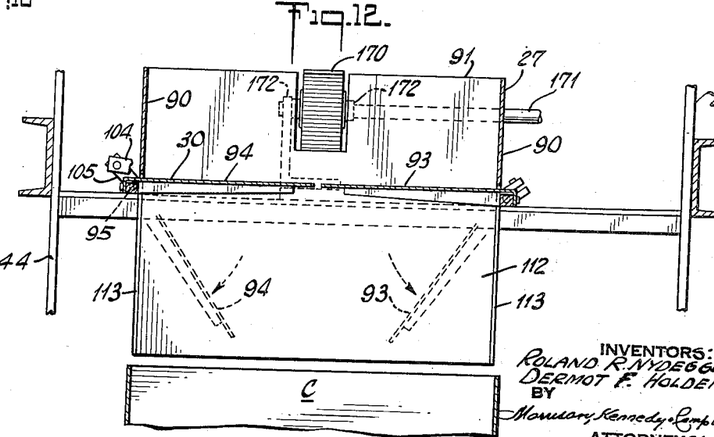
Fig. 12 is a detail section taken approximately along the lines 12—12 of Fig. 10.

In position shown in Fig. 11, the operating mechanism described maintains the drop floor 30 in horizontal closed stack supporting position. When dumping of the stack into the carton below the hopper is indicated, the flow of air into the cylinder 100 is controlled to move the piston rod 101 upward (Fig. 11). This actuates the linkage 102, 103, 104, 105 and 106 and causes the two hinge shafts 95 to be rotated in opposite directions and the floor sections 93 and 94 to swing downward into stack dumping position, as shown in Fig. 5.

The actuation of the pneumatic unit is effected automatically in response to the counter 35 (Fig. 24) through solenoid operated valves 110 and 111 (Figs. 10 and 24), in a manner to be more fully described.

Between the bottom of each hopper 27 and 28 and the top of its corresponding carton C and C' is a space to allow full downward swing of the floor sections 93 and 94. In this space is provided end guide walls 112 (Figs. 10 and 12) forming downward extensions of the hopper end walls 91 and having side flanges 113 serving as stops to limit the downward swing of the floor sections 93 and 94. These end guide walls 112 maintain the ends of the sheets in the stack aligned while said stack is being dumped into the carton below.

Carton holding, supporting and conveying mechanism

Below the hopper 27 is the carton C and below the hopper 28 is the carton C'. These cartons C and C' are supported on the take-away conveyor 31 and are held in exact aligned position underneath the hoppers 27 and 28 respectively in the manner shown in Figs. 8, 10 and 11. To support the cartons C and C' in exact spaced relationship along the upper conveyor run 32, the conveyor 31 comprises two endless link chains connected together for movement in unison, and these chains carry lugs 115 (Figs. 8 and 10) serving not only to locate the cartons properly along the conveyor but also to push the cartons along with the conveyor, when said conveyor is operated.

Figures 6, 7, 8:
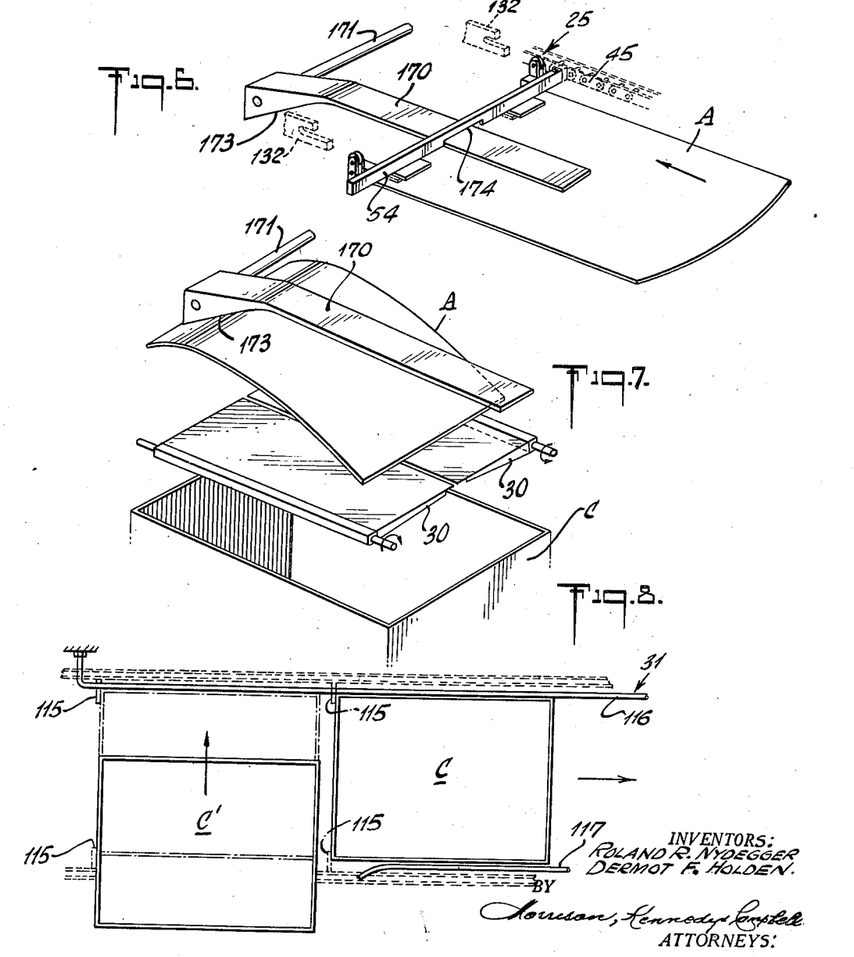
Fig. 6 is a perspective showing a sheet approaching into position to be released from the conveyor and to be directed into the hopper for stacking.
Fig. 7 is a perspective similar to that of Fig. 6 but showing the released sheet in a more advanced position and at the phase when its front section is being deflected downward into the hopper.
Fig. 8 is a top plan view of the conveyor supporting the packaging cartons.

To hold the cartons C and C' in proper position transverse to the conveyor 31 without interfering with the intermittent operation of said conveyor, one side of the machine has fixed to the frame piece 44 a rail 116 (Figs. 8, 10 and 11) long enough to extend along both cartons. On the other side of the machine and fixed to the other frame piece 44 is a rail 117, which extends along the carton C but which is short of reaching the carton C' beneath the hopper 28, so that an opening is provided for the entry of an empty carton onto the conveyor 31 and in position below the hopper 28, as shown in Fig. 8.

The conveyor 31 is operated intermittently between stack dumping operations when the carton C has been filled and when the carton C' is about half-filled. For that purpose, the shaft 118 (Fig. 10) which drives one of the sets of sprockets 120 over which the conveyor chains are trained carries a one-directional clutch 121 of the well-known type. The driven part of this clutch 121 is secured to the shaft 118 and the driving part carries a gear 122 which meshes with a rack 123 secured to the piston or plunger rod of a pneumatic cylinder 124. These clutch parts are arranged through the well-known intervening wedges and cam devices to cause the shaft 118 to rotate with the driving clutch part when said driving part is rotated clockwise (Fig. 10) and to cause said driving part to rotate idly when turned counterclockwise.

The air flow to the pneumatic cylinder 124 is controlled from the counter 35 (Fig. 24) through solenoid valves 125 and 126 (Fig. 10) which in turn control air flow to and from the pneumatic cylinder 124. When the required condition of the cartons C and C' is reached, the counter 35 through the solenoid valves 125 and 126 and the pneumatic cylinder 124 causes the rack 123 to move downward and to drive thereby the shaft 118 a sufficient number of revolutions to move the conveyor 31 one step. This moves the carton C underneath the hopper 27 out of the way and moves the carton C' from a position underneath the hopper 28 to a position underneath the hopper 27, where the filling of said latter carton is resumed.

When the desired step movement of the conveyor 31 is completed, the conveyor comes to rest and the piston rod returns upward to its initial position. This brings the rack 123 up into position in preparation for the next step movement of the conveyor 31. This return movement of the rack 123 has no rotative effect on the shaft 118 because of the idling action of the one-directional clutch 121.

Cam devices for operating the sheet gripping devices at the stacking stations To release the sheets A from the gripping devices 25 as they move over the first hopper 27, and to permit thereby the sheets to be directed into the hopper, there is provided two sheet releasing cams 132 (Figs. 9, 10 and 17 to 20) on the sides of the machine, each presenting a cam surface 133 extending across the end of the cam and along the underside thereof. The cams 132 are mounted for translational movement in and out of the path of the cam follower rollers 64 carried by the gripping devices 25, but are held against rotation by a fixed pin 134 secured to a side frame piece and extending into a recess 135 in each of said cams.

For moving each of the cams 132 into and out of operative position, there is provided a mechanism comprising a shaft 136 extending crosswise of the machine and journalled in suitable bearings. Slidable over each end of this shaft 136 is a sleeve 137 carrying at its outer end the corresponding sheet releasing cam 132 and carrying at its inner end a cam bar 138 having a cam surface 140. Rigidly secured to the shaft 136 near each of the cam bars 138 is a collar 141 having a radial arm 142 secured thereto and carrying a roller 143 at its outer end in cam follower engagement with the cam surface 140. A pair of coil springs 144 secured at the ends to the sleeve 137 and to the corresponding collar 141 normally urge the sleeve axially towards the collar and normally urge the shaft 136 rotatively in position in which the roller 143 is on the low part of the cam surface 140, as shown in dot and dash lines in Fig. 18. In this position, the corresponding sheet releasing cam 132 on one side of the machine is in inactive position shown in dot and dash lines in Fig. 17 out of the path of the cam follower rollers 64 carried by the sheet gripping devices 25 on this side of the machine.

Upon rotation of the shaft 136 clockwise (Fig. 18), the two collars 141 secured thereto are rotated therewith and this causes the two rollers 143 carried by said collars respectively to ride down along the respective cam surfaces 140 to the high parts thereof, from the dot and dash line position to the full line position shown. This operation moves the sheet releasing cams 132 outwardly along the shaft 136 into the operative full line positions shown in Fig. 17 in the paths of movement of the cam follower rollers 64 carried by the sheet gripping devices 25.

The clockwise rotation of the shaft 136 (Fig. 18) into position to bring the sheet releasing cams 132 outwardly into sheet releasing active positions is effected in response to the actuation of the counter 35 (Fig. 24) through a solenoid valve or valves (not shown) controlling flow to an air cylinder 150 (Figs. 17 and 20) mounted on the side of the machine. This air cylinder 150 has a plunger 151 bearing against an arm 152 secured to a shaft 153 carrying a gear 154 meshing with a gear 155 on the shaft 136. The arm 152 is urged clockwise (Fig. 20) against the plunger 151 by the action of the coil springs 144 or if these springs do not offer sufficient strength for the purpose, another coil spring may be employed acting directly on this arm.

Figures 17, 19:
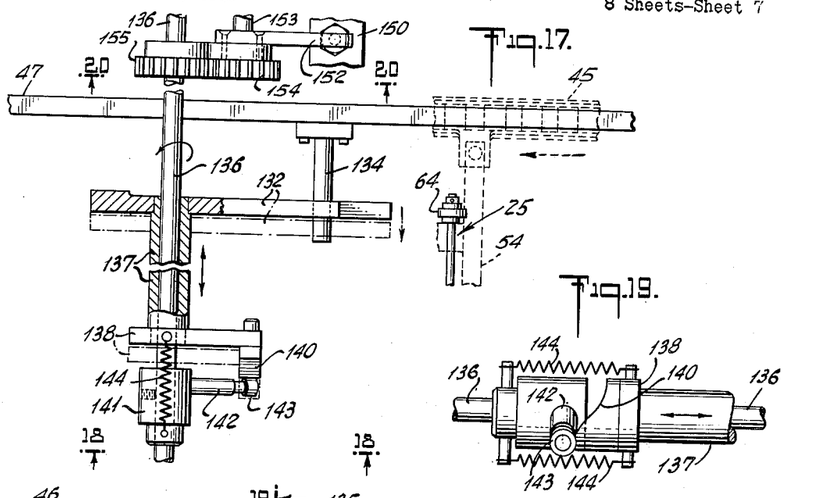
Fig. 17 is an enlarged fragment of Fig. 9 taken approximately along the lines 17—17 of Fig. 10 and showing part of the cam device for releasing the sheet near a stacking hopper prior to its being directed thereto.
Fig. 19 is a detail section of the cam device taken along lines 19—19 of Fig. 18.
Figure 18:
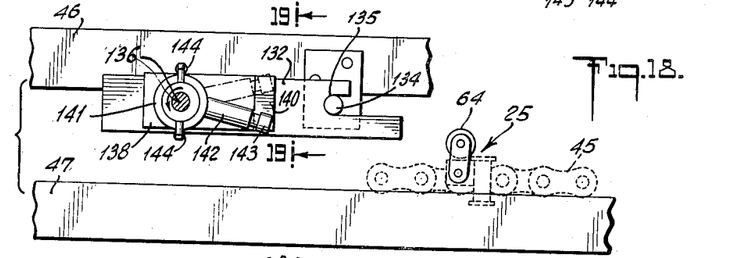
Fig. 18 is a section of the cam device taken along the lines 18—18 of Fig. 17.
Figure 20:
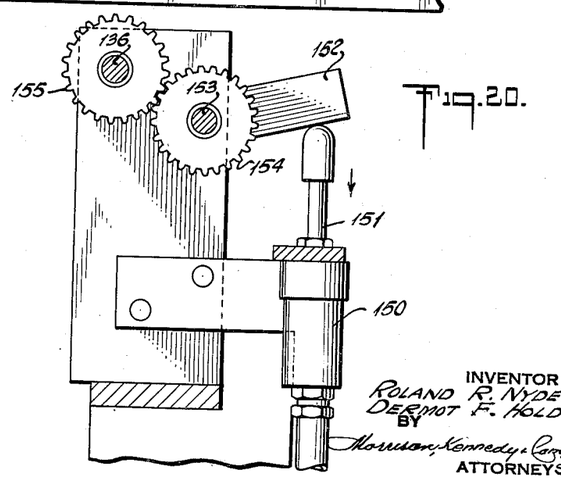
Fig. 20 is a detail section of the mechanism for operating the cam device of Fig. 17 taken approximately along the lines 20—20 of Fig. 9.

While the hopper 27 is being filled, the plunger 151 in response to the control from the counter 35 (Fig. 24) is in its uppermost position shown in Fig. 20 and the sheet releasing cams 132 are therefore in their outermost active position shown in full lines in Fig. 17. In these positions of the cams 132, as a gripping device 25 pulling a sheet A along the course of the bottom run 20 of the sheet advancing conveyor 15 approaches directly over the first hopper 27, the cam follower rollers 64 carried by said gripping device first strike the ends of the cams 132 defining part of their cam surfaces 133, and are tilted thereby about the axis of the rock shaft 60 forming part of said gripping device to cause the gripping plates 67 to move into sheet releasing positions. The cam follower rollers 64 continue their movement along the bottom longitudinal edges of the cams 132 defining the other part of the cam surfaces 133, so that the gripping plates 67 are maintained in open sheet releasing positions for a short interval until the rollers ride off said cams. The released sheet A continues its movement under the impulse of the momentum imparted to it by the conveyor 31 but a reduced speed, until it strikes a deflecting surface and is directed downward thereby into the hopper 27, as will be more fully described hereinafter.

For releasing the sheets A as they approach directly over the second hopper 28 during the intervals when the sheets are being shunted past the hopper 27, there is provided two fixed cams 160 (Figs. 9 and 10) rigidly secured to the frame structure of the machine in the paths of movement of the cam follower rollers 64 carried by the gripping devices 25. These fixed cams 160 present end and bottom longitudinal cam edges as in the case of the movable sheet releasing cams 132 to tilt the cam follower rollers 64 about the axis of the rock shaft 60 as said rollers pass by said cams and to release thereby the sheets A from the gripping devices 25. Each sheet A released by the action of the fixed cams 160 continues its movement under the impulse of the momentum imparted to it by the conveyor 31 but at a reduced speed, until it strikes a deflecting surface and is directed downward thereby into the hopper 28, as will be more fully described hereinafter.

Sheet deflector mechanisms

For deflecting the released sheets A as they move successively into position over the hopper 27, there is provided a movable deflector bar 170 (Figs. 6, 7, 9, 10, 11 and 12) which in active position extends across the top of the hopper above the course of the sheets advanced by the bottom run 20 of the conveyor 15 and which is secured at one end to a pivot shaft 171 supported in suitable bearing 172. This deflector bar 170 has a sheet deflecting surface 173 near its pivoted end curved with a downward outward slope and adapted to engage the forward end of the released sheet A as it is gliding in the general direction of the bottom run 20 of the sheet advancing conveyor 15. The bar 54 serving as the support structure for each sheet gripping device 25 has a recess 174 (Fig. 6) to clear the deflector bar 170, as said gripping device passes along and over said deflector bar.

Since the sheets A are held only at their side edges by the gripping plates 57 and 67 and since these sheets are flexible, when these sheets move along the course of the bottom run 20 of the sheet advancing conveyor 15, they have a slight catenary sag along its lengths as shown in Fig. 6. Therefore, at the instant the sheets A are released by the cams 132, the sheets have a certain amount of rigidity imparted thereto by the longitudinal sag therein, causing them to glide forwardly by natural flight substantially along their previous course but at a reduced rate. Because of this reduced speed of a released sheet A, the next succeeding sheet A which is being positively advanced at the greater speed of the conveyor 15 is catching up with it, and unless the trailing end of the released sheet is moved out of the way, the forward end of the next succeeding sheet may overlap said trailing end and interfere with orderly stacking at high speed.

As the forward end of a released sheet gliding by natural flight reaches the deflecting surface 173 of the deflector bar 170, the forward section of the sheet is progressively turned downwardly towards the hopper 27, causing thereby the sheet to be transversely straightened out and the longitudinal sag to be eliminated. This renders the sheet limp and causes the trailing section or tail end of the sheet to droop downward into the hopper 27 and out of the way of the forward end of the next succeeding sheet as shown in Fig. 7 and in dot and dash lines in Fig. 1. The downward gravitational descent of the released deflected sheet in the hopper 27 can thereby be effected under control and without interfering with preliminary stacking action on the next succeeding sheet.

Where the sheets are close together in their line of advancement along the conveyor 15, and where the machine is operated at high speed, streams of air from the nozzles of a manifold pipe above each hopper may be projected downward against the tail ends of the sheets as they are being stacked in the hoppers 27 and 28, to assure against the interference of these sheets with the advance of the next succeeding sheets.

The deflector bar 170 is maintained in active raised position above the course of the sheets advanced by the lower run 20 of the conveyor 15 until a predetermined number of sheets has been collected and stacked into the hopper 27. During this period, none of the sheets reaches the second hopper 28. When this predetermined number has been stacked, the counter 35 (Fig. 24) causes the sheet releasing cams 132 to move into inoperative position out of the path of travel of the cam follower rollers 64 on the sheet gripping devices 25, in a manner already described, and causes the deflector bar 170 to be moved out of the path of travel of the sheets being advanced by the bottom run 20 of the conveyor 15. This causes the procession of sheets A to by-pass the deflector bar 170 and to move into position to be stacked into the second hopper 28.

To actuate pivot shaft 171 of the deflector bar 170 for sheet switching purpose, there is provided a solenoid 180 (Figs. 11 and 23) which has its circuit controlled by a switch from the counter 35 (Fig. 24), as will be more fully described, and which actuates the pivot shaft 171 through a toggle connection between its armature plunger 181 and the shaft 171. This toggle connection comprises a link 182 and a crank 183, said link being pivotally connected at one end to the outer end of the solenoid plunger 181 and pivotally connected at its other end to the outer end of a crank 184, said cranks 184 and 183 turning on the pivot shaft 171 and on a stub shaft 186 respectively. A spring 187 acting on the crank 185 urges the solenoid plunger 181 upwardly and a fixed stop 188 engaging the offset end of an arm 190 secured to the pivot shaft 171, limits the deflector bar 170 in the operative position described.

Figure 23:
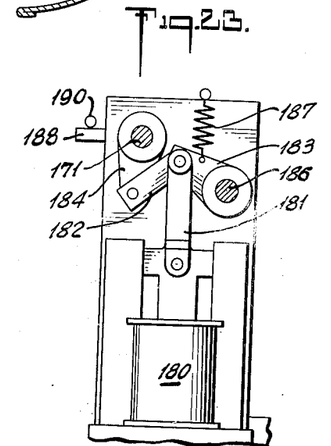
Fig. 23 is a detail section of the mechanism for operating the movable sheet deflector bar associated with one of the stacking hoppers.

In the position shown in Fig. 23, the solenoid 180 is deenergized and the pivot shaft 171 is held by the spring 187 in rotative position to maintain the deflector bar 170 in the operative position described, to direct the sheets downward into the hopper 27. When the required number of sheets have been stacked in the hopper 27, a switch in the counter 35 (Fig. 24) closes the circuit of the solenoid 180 and causes its armature plunger 181 to be withdrawn downward (Fig. 23) in the energized solenoid. This rotates the pivot shaft 171 of the deflector bar 170 clockwise (Fig. 23) and causes the deflector bar to be depressed downward out of the way of the succeeding procession of sheets.

For deflecting the released sheets A as they move successively into position over the hopper 28, during the interval when the deflector bar 27 is in depressed inactive position, there is provided a fixed deflector bar 190 (Fig. 10) secured at one end to the frame structure and extending across the top of the hopper above the course of the sheets advanced by the bottom run 20 of the conveyor 15. This deflector bar 190 has a sheet deflecting surface 191 near one end curved with a downward outward slope and adapted to engage the forward end of the released sheet A as it is gliding in the general direction of the bottom run 20 of the sheet advancing conveyor 15. The shape and function of the deflector bar 190 is similar to that of the deflector bar 170 described, except that the deflector bar 190 is fixed and is consequently always in the path of the sheets advanced by the conveyor 15.

Sheet rejecting device

Figure 21:
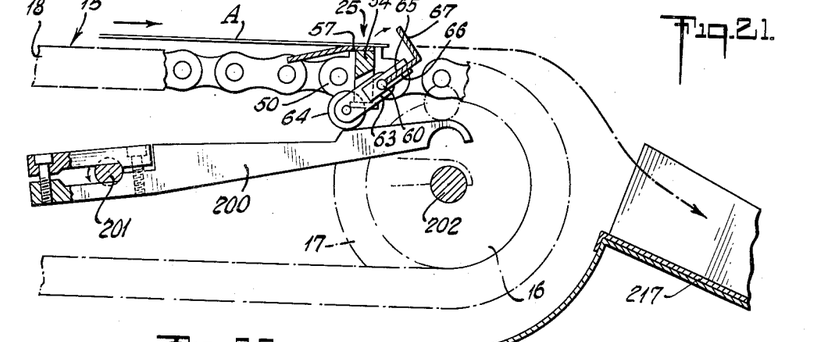
Fig. 21 is a detail section of the cam device for operating the sheet rejecting mechanism taken along the lines 21—21 of Fig. 9.

In case a defective sheet is in the advancing line of the sheets, the operator can quickly remove this sheet from the line without interfering with continuous operations. To that end, there is provided a sheet reject device comprising a pair of cams 200 (Figs. 9, 22 and 23) fixed at one end to a shaft 201 and hooked normally in inactive position to the shaft 202 of the sprockets 17 of the sheet advancing conveyor 15. In these inactive positions, the cams 200 are located in the planes of movement of the cam follower rollers 64 on the sheet gripping devices 25 but below the path of the rollers supported on the upper run 18 of the conveyor 15. In normal operations, the sheets held by the gripping devices 25 travel along the course of the upper run 18 of the conveyor 15, over the sprockets 17 and then along the course of the lower run 20 of said conveyor. Before a sheet A held by a gripping device 25 reaches the turning part of the conveyor 15 near the sprockets 17, the operator may raise the cams 200 into the path of the cam follower rollers 64 carried by said gripper device as shown in Fig. 21, to release said sheet for rejection purposes. This cam raising operation is effected through a solenoid 205 (Fig. 22) having an armature plunger 206 rotating the cam shaft 201 through a toggle connection comprising a pair of links 207 and 208 pivotally connected at one end to the outer end of said armature plunger and pivotally connected at their other ends to the outer end of a crank 210 on the cam shaft 201 and to the outer end of a crank 211 on a stub shaft 212. A spring 213 acting on the crank 211 urges the solenoid plunger 206 upwardly and a fixed stop 214 engaging a lug or finger 215 on the hub of the crank 210 limits the inoperative rotative position of said crank 210.

Figure 22:
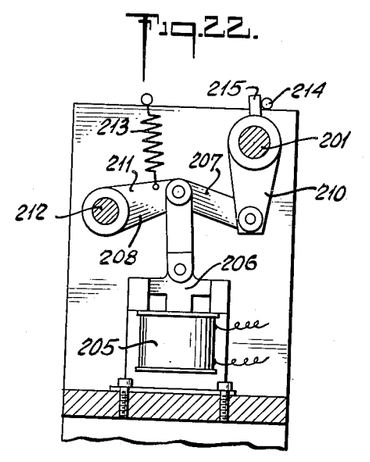
Fig. 22 is a detail section of the mechanism for operating the cam device of Fig. 21 taken along the lines 22—22 of Fig. 9.

When the rejection of a sheet near the sprockets 17 is desired, the operator closes the switch of the circuit of the solenoid 205, and energizes said solenoid. The causes the armature plunger 206 to be drawn downward into the solenoid 205 against the action of the spring 213, and the cam shaft 201 to rotate counterclockwise (Fig. 22). This raises the cams 200 angularly upward into the operative position shown in Fig. 21 in the path of the incoming cam follower rollers 64 of the gripping device 25 holding the sheet to be rejected and as these rollers ride along the cam surfaces on said cams, the gripping plates 67 of said device are tilted into open sheet releasing position shown. The released sheet resting on the top run 18 of the conveyor 15 continues to be moved thereby along the course of said run, but its forward end instead of following the curvature of the sprockets 17 as in the case of a gripped sheet droops sufficiently to fall into an inclined chute 217 and to be discharged therealong out of the line of procession of the advancing sheets.

As soon as the sheet to be rejected has been released by the gripping device 25 holding it, the switch effecting the energization of the solenoid 205 is again opened, and the solenoid deenergized. This returns the cam operating mechanism to the position shown in Fig. 22 under the action of the spring 213 and the sheet reject cams 200 into inoperative position below the path of the cam follower rollers 64 on the gripping devices 25.

The circuit of the solenoid 205 is operable when energized for sheet reject operations to render inoperative the counter 35 (Fig. 24) for one sheet counting step, so that the rejection of the sheet does not throw the machine out of count. This compensating operation may be effected in any suitable manner, as for example by interrupting a ratchet and pawl drive to the counter 35 for one step, as will be more fully described hereinafter.

Counter mechanism

The counting of the sheets is effected at any suitable station in the system. In the specific form shown, the counting is done from a shaft 220 (Fig. 24) which carries the cutter for cutting the continuous strip into sheet sections before these are fed successively into the sheet delivery and stacking machine of the present invention. Since every revolution of the cutter shaft 220 corresponds to a sheet, this shaft may conveniently constitute the master control for the different automatic operations in the sheet delivery and stacking machine. The counter 35 itself is of standard construction and is shown only somewhat diagrammatic for the sake of simplicity. This counter 35 generally comprises a shaft 221 carrying a series of cams 222, 222a, etc. varying in conformation according to the operation to be controlled or effected therefrom and a series of micro-switches 223 actuated by these cams respectively and serving to control the circuits of the different mechanisms requiring changeovers and operations at different counting phases of the machine. The cutter shaft 220 drives the counter shaft 221 step by step through a ratchet and pawl device 224 serving to turn the counter shaft one step for each revolution of the cutter shaft corresponding to each sheet fed to the sheet delivery and stacking machine.

As a general example of how the counter 35 controls the different operations, there is illustrated schematically for the sake of simplicity, the control of the pneumatic cylinder 100 for the sheet deflector bar 170 through the action of one of the counter cams 22 on the corresponding switch 223. The circuits of the two solenoid units 110 and 111 may be controlled from this switch 223, through the intermediacy if desired, of a holding relay, switch and/or similar electrical expedients well known in the art and indicated diagrammatically as a unit 226. When for example, the proper period has been reached in the counting cycle for the movement of the drop floor 30 into open stack dumping position, a high point in the cam 222 closes the corresponding switch 223 of the circuits which control the two solenoid valve units 110 and 111. This operation moves the valves in these units 110 and 111 into position to move the piston rod 101 upward and to swing thereby the drop floor sections 93 and 94 downwardly in a manner previously explained. The subsequent step or steps of the counter shaft 221 moves the cam 222 into position to release the corresponding switch 223 and to change thereby the condition of the circuits of the solenoid valve units 110 and 111, so that air flow in the pneumatic cylinder 101 is reversed and the floor sections 93 and 94 are restored thereby into sheet supporting position in preparation for the next stacking cycle.

The solenoid 205 (Fig. 22) employed in connection with the operation of the reject cams 200 controls the circuit of a solenoid (not shown) having its armature operating the pawl of the ratchet and pawl drive 224 between the cutter shaft 220 and the counter shaft 221, when such operation is indicated by a sheet reject manipulation. When the solenoid 205 is operated by manual control to reject a sheet in the manner previously described, the solenoid associated with the pawl is energized to move said pawl into inactive position. The next revolution of the cutter shaft 220 will therefore be an idle one, as far as its effect on the counter shaft 221 is concerned, so that the sheet reject operation will cancel out one counter step and thereby compensate for the elimination of a sheet in the procession of sheets to the stacking stations.

*Operation*

Although the operation of the sheet delivery and stacking machine is apparent from the foregoing description, it is summarized herein and described in connection with a system, in which each carton is to be completely filled with 200 sheets and the changeovers from one stacking hopper to the other is to be made after the collection and stacking of 25 sheets in each hopper 27 or 28.

It is assumed that the machine is in initial phase with an empty carton C' below the stacking hopper 28 and a carton C below the stacking hopper 27 half-filled and containing 100 sheets and that (1) the deflector bar 170 over the first hopper 27 is in raised active position to deflect and direct the sheet successively into said hopper 27, (2) the sheet releasing cams 132 are in operative position in the path of the cam follower rollers 64 of the sheet gripping devices 25 to release the sheets as they move into position over said hopper 27 and (3) the drop floor 30 of said hopper 27 is closed and in position to support a stack of sheets thereon. Under these conditions, as the sheets A are successively moved into the field of action of the cams 132, they are released thereby from their respective gripping devices 25 and permitted to glide under natural flight conditions, until they are deflected and directed downward into the hopper 27, in a manner previously described. This operation is continued with successive sheets A, until the counter 35 indicates that 25 sheets have been released and stacked into the hopper 27. At that instant, the proper cam 222, 222a, etc. in the counter 35 is in position to move the sheet releasing cams 132 into inoperative position out of the path of the cam follower rollers 64 of the sheet gripping devices 25 through actuation of the solenoid valve controlling air flow to the air cylinder 150 operating the cam moving mechanism. Substantially at the same time, as the last of the 25 sheets is descending into the stacking hopper 27, the deflector bar 170 moves down about the axis of the pivot shaft 171 against said last sheet, to speed up the descent of said last sheet and to move into inoperative position below the course of the sheets on the bottom run 20 of the sheet advancing conveyor 15, so that the succeeding sheets by-pass said deflector bar and pass into the field of action of the fixed deflector bar 190 associated with the hopper 28. This downward pivotal movement of the deflector bar 170 is effected from the appropriate cam 222, 222a, etc. in the counter 35, through the actuation of the solenoid 180. The sheets A thereafter by-pass the sheet releasing cams 132 and the deflector bar 170 and move into the field of action of the fixed sheet releasing cams 160 and the fixed deflector bar 190 associated with the hopper 28. There the sheets are successively released, deflected and directed downward for stacking in the hopper 28.

Soon after the deflector bar 170 has been moved downward into inoperative position described and while the sheets A are being switched over to the hopper 28 and stacked therein, the counter 35 through appropriate cams 222, 222a, etc. actuates the solenoid valve units 110 and 111 controlling flow to the pneumatic cylinder 100 and causes the sections 93 and 94 of the drop floor 30 of the hopper 27 to swing downward into open position. This causes the stack of 25 sheets to drop into the carton C below the hopper 27. This switching operation is effected without interfering with the continuous flow of sheets to the hopper 28.

The floor sections 93 and 94 of the hopper 27 then return into closed position in preparation for the next stacking cycle in connection with said hopper, while the sheets continue to be stacked into the hopper 28, until 25 sheets have been collected in said hopper 28. At that instant, an appropriate cam or cams 222, 222a, etc. in the counter 35 again move the sheet releasing cams 132 into operative position in the path of the cam follower rollers 64 carried by the sheet gripping devices 25 and at substantially the same time, the deflector bar 170 is moved upward into operative position to shunt the procession of sheets back again towards the hopper 27. The appropriate cam 222, 222a, etc. in the counter 35 comes into play about this time, while the hopper 27 is being stacked, to swing the floor sections 93 and 94 of the hopper 28 downward and to cause thereby the stack of 25 sheets in said hopper to drop into the carton C' below. These floor sections 93 and 94 are then returned into closed position in preparation for the next stacking cycle in connection with the hopper 28.

The alternate filling and dumping of the hoppers 27 and 28 automatically and cyclically repeated as described, until the carton C' is half-filled with 100 sheets. At that phase in the interval between stack dumping operations, the appropriate counter cam 222, 222a, etc. comes into play to operate the pneumatic unit 124 through its solenoid valves 125 and 126 and to cause the take-away conveyor 31 to move one step in a direction to carry the filled carton C out of the way for closing or other packaging operation and to transfer the half-filled carton C' from position under hopper 28 to position under the hopper 27. The operator then inserts an empty carton under the hopper 28. These carton transfer operations are all carried out without interfering with the continuous operation of the machine.

While the invention has been described with particular reference to a specific embodiment, it is to be understood that it is not to be limited thereto but is to be construed broadly and restricted solely by the scope of the appended claims.

What is claimed is:

1. In a sheet delivery and stacking machine, a pair of sheet stacking hoppers disposed alongside of each other and each having a drop floor, means for supporting a carton under each of said hoppers, means for advancing a succession of sheets to the first of said hoppers, means for stacking the sheets successively in said first hopper as they reach said first hopper, means automatically operable when a predetermined number of sheets have been stacked in said first hopper for switching the advancing procession of sheets to the second of said hoppers, means correlated with the operation of said switching means for opening the floor of said first hopper approximately at the same time said switching means is operated to dump the stack of sheets collected in said first hopper into the carton below said first hopper, means for stacking the sheets successively in said second hopper as they reach said second hopper, means automatically operable when a predetermined number of sheets have been stacked in said second hopper for switching the advancing procession of sheets back to said first hopper, and means correlated with the operation of said last mentioned switching means for opening the floor of said second hopper approximately at the same time said latter switching means is operated to dump the stack of sheets collected in said second hopper into the carton below said second hopper.

2. In a sheet delivery and stacking machine, a pair of sheet stacking hoppers disposed alongside of each other and each having a drop floor, means for advancing a succession of sheets past the first one of said hoppers and then past the other, a deflector member disposed in operative position above the first of said hoppers and in the path of travel of the sheets to engage the leading ends of the sheets and deflect the sheets from said path into said first hopper and stack them in said first hopper, said deflector member being movable from said operative position into inoperative position out of the path of travel of the sheets, means automatically operable when a predetermined number of sheets have been stacked in said first hopper for moving said deflector member into said inoperative position to cause the advancing sheets to pass beyond said first hopper towards the second of said hoppers and for opening the floor of said first hopper to dump the stacked sheets from said first hopper to a supporting surface below, a deflector member disposed above the second of said hoppers and in the path of travel of the sheets to engage the leading ends of the sheets and deflect the sheets that reach said second hopper from said path into said second hopper and stack them in said second hopper, and means automatically operable when a predetermined number of sheets have been stacked in said second hopper for moving said movable deflector member back into said operative position and for opening the floor of said second hopper to dump the stacked sheets from said second hopper to a supporting surface below.

3. In a sheet delivery and stacking machine, the combination as described in claim 2, wherein the means for advancing the sheets comprises an endless conveyor having a bottom horizontal run extending over the upper open ends of the stacking hoppers and having gripping means to engage the forward ends of the successive sheets at the sides only.

4. In a sheet delivery and stacking machine, the combination comprising a pair of stacking hoppers disposed alongside of each other and each having a drop floor, an intermittently operated conveyor below said hopper having a top horizontal run for supporting two piles of sheets thereon extending in a travelling direction from the bottom of one hopper to the bottom of the other, means for filling said hoppers alternately, each with a predetermined number of stacked sheets and for opening the floor of each hopper as a stack is formed therein to dump the stack on to said conveyor while stationary, whereby the stacks are collected on said conveyor into two piles below said hoppers respectively, and means operable automatically after a predetermined number of stacks from each hopper have been collected in the underlying pile for operating said conveyor one step in said direction to move a complete pile under the first hopper out of the way for removal from said conveyor and to move an incomplete pile from position underneath the second hopper to a position underneath said first hopper to permit the incomplete pile to be completed.

5. In a sheet delivery and stacking machine, the combination comprising a pair of stacking hoppers disposed alongside of each other and each having a drop floor, an intermittently operated endless conveyor below said hopper having a top horizontal run extending in a travelling direction from the bottom of one hopper to the bottom of the other, means for supporting two cartons on said run in predetermined position directly below said hoppers respectively, means for filling said hoppers alternately, each with a predetermined number of stacked sheets and for opening the floor of each hopper as a stack is formed therein to dump the stack into the carton underneath the hopper and to form a pile wherein while the conveyor is at rest, and means automatically operable when a predetermined number of stacks from each hopper have been dumped into the carton underneath for operating said conveyor one step in said direction to move one carton out of the way of the first hopper and to move the other carton from underneath the second hopper into a position underneath said first hopper.

6. In a sheet delivery and stacking machine, the combination comprising a stacking hopper open at the top and having a drop door, a continuously operated endless conveyor having a bottom horizontal run extending over the open top of said hopper for advancing a continuous succession of separate sheets in spaced end to end relation from a supply point into the stacking field of action of said hopper, means operable as the sheets reach said hopper for directing the sheets into said hopper into stacked position, an intermittently operated endless conveyor below said hopper having a horizontal run for supporting a carton underneath said hopper, means automatically operable when a predetermined number of sheets have been stacked in said hopper for opening said floor to dump the stack into said carton and to form thereby a pile therein while the conveyor is at rest, and means operable automatically after a predetermined number of stacks have been dumped into said carton for moving said second-mentioned conveyor one step and then allowing it to come to rest to cause said carton with its plurality of contained stacks to be moved out from below said hopper and to permit another carton to be placed below said hopper.

7. In a sheet delivery and stacking machine, the combination comprising a pair of stacking hoppers disposed alongside of each other and each having a drop floor and an open top, a continuously operated first endless conveyor having a bottom horizontal run extending across the open tops of said hoppers for advancing a succession of sheets from a supply point past said hoppers, an intermittently operated second endless conveyor below said hoppers having a top horizontal run for supporting a pair of cartons below said hoppers respectively and extending across the bottoms of the hoppers in a direction substantially parallel to the general direction of the bottom run of said first conveyor, means for filling said hoppers alternately from the sheets advanced by the bottom run of said first conveyor, each with a predetermined number of stacked sheets and for opening the floor of each hopper as a stack is formed therein to dump the stack into the carton underneath the hopper and to form a pile therein while the second conveyor is at rest, and means automatically operable when a predetermined number of stacks have been dumped into a carton underneath one of the hoppers, for operating said second conveyor one step in a direction to move the latter carton out of the way for removal from said second conveyor and to move the other carton into position previously occupied by the removed carton underneath the last mentioned hopper.

8. In a sheet delivery and stacking machine, an endless conveyor having a bottom horizontal run, pairs of gripping devices on said conveyor spaced from each other across the width of the conveyor for holding the side edges only of the forward end of each of a procession of sheets and advancing them edgewise along the course of said bottom conveyor run and below said run, said sheets having a catenary sag between the side edges of the sheets where they are held by said gripping devices as they travel along the course of said bottom conveyor run, a stacking hopper below said bottom conveyor run, means for releasing said sheets from said gripping means as they reach a position over said hopper, said sheets when released being entirely free from support as well as free to continue their advance without restraint under their own momentum alone, and means interposed in the line of flight of the released and unsupported sheets as they continue their advance under their own momentum for deflecting the forward end sections of said sheets downward into the hopper and for removing thereby the sag from said sheets, whereby said sheets are rendered limp and the tail sections of said sheets droop downward in said hopper out of the way of the next succeeding sheets.

9. The method of stacking sheets which comprises positively advancing a succession of sheets edgewise over a stacking hopper along a predetermined course by gripping the leading end of each sheet at spaced points across the sheet adjacent the side edges only of said sheet to form a sag therein substantially catenary in form, releasing the sheets from advancing restraint and leaving them entirely free from support as they reach a position over said hopper to cause the sheets so released due to the rigidity imparted thereto by the sag to glide by natural flight alone substantially along said course, and deflecting the forward end section of the released and unsupported sheet during its flight downward towards the interior of said hopper to stop said flight and to direct the sheet into the hopper substantially facewise and as a whole for stacking, the downward deflection of the forward end section of the sheet eliminating the sag therein and causing said sheet to become limp, whereby the tail end of the sheet droops downward in the hopper out of said predetermined course.

References Cited in the file of this patent

UNITED STATES PATENTS

| | | |
|---|---|---|
| 1,094,048 | Barber | Apr. 21, 1914 |
| 1,226,168 | Barber | May 15, 1917 |
| 1,975,764 | Blaine | Oct. 9, 1934 |
| 2,001,296 | Barber | May 14, 1935 |
| 2,125,467 | Sinclair | Aug. 2, 1938 |
| 2,375,241 | Lindgren et al. | May 8, 1945 |
| 2,427,223 | Moore | Sept. 9, 1947 |
| 2,572,980 | Bradford et al. | Oct. 30, 1951 |